A. D. DARLING.
NUT LOCK.
APPLICATION FILED DEC. 6, 1911.
1,034,697.
Patented Aug. 6, 1912.
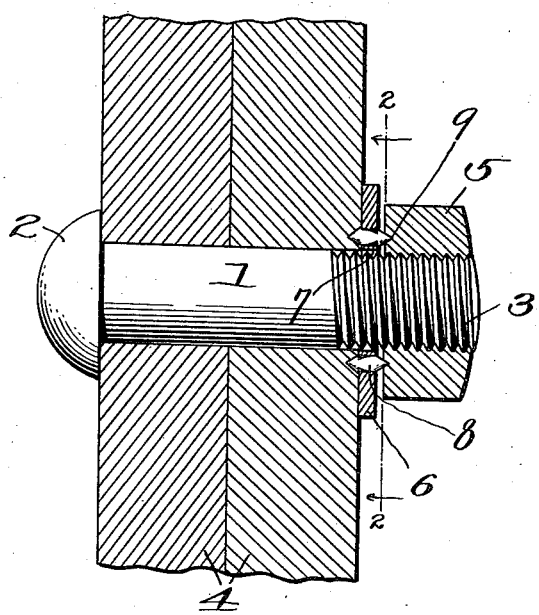
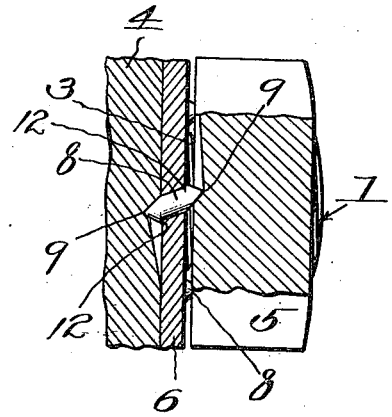
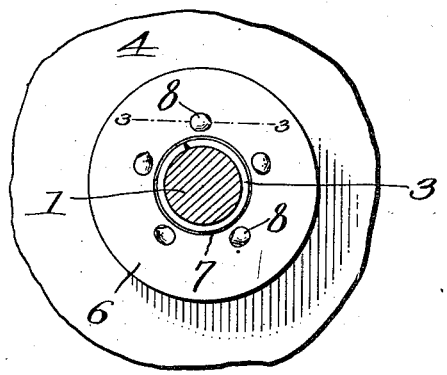
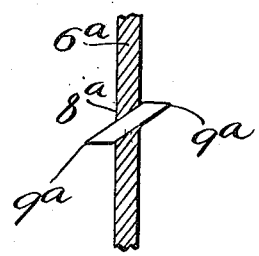
Witnesses
Olin W. Holmes
N. C. Stafford, Jr.
Inventor
A. D. Darling
By N. S. ......
Attorney

UNITED STATES PATENT OFFICE.

ASA D. DARLING, OF BOYNE CITY, MICHIGAN.

NUT-LOCK.

1,034,697.

Specification of Letters Patent.   Patented Aug. 6, 1912.

Application filed December 6, 1911.   Serial No. 664,271.

*To all whom it may concern:*

Be it known that I, ASA D. DARLING, a citizen of the United States, residing at Boyne City, in the county of Charlevoix and State of Michigan, have invented certain new and useful Improvements in Nut-Locks, of which the following is a specification.

The present invention relates to certain new and useful improvements in nut locks, and has for its object to provide a device of this character which embodies novel features of construction whereby the nut is effectively prevented from working loose after it has once been tightly turned into position.

A further object of the invention is to provide a nut lock which is simple and inexpensive in its construction, which can be readily applied without necessitating any changes in the construction of the bolt or nut, and which will serve to prevent backward turning of the nut after it has once been firmly seated in position.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a sectional view through a nut locking device constructed in accordance with the invention. Fig. 2 is a transverse sectional view on the line 2—2 of Fig. 1. Fig. 3 is a sectional view on the line 3—3 of Fig. 2, and Fig. 4 is a sectional view through a portion of a nut locking washer, showing a slightly modified form of the invention.

Corresponding and like parts are referred to in the following description and indicated in all the views of the drawing by the same reference characters.

Specifically describing the present embodiment of the invention which is illustrated on the accompanying drawings, the numeral 1 designates a bolt which is of the usual construction, and is formed with a head 2 and a threaded portion 3. This bolt is shown as serving to hold two boards 4 or similar members together, and a nut 5 is screwed upon the threaded end 3 of the bolt.

The invention resides more particularly in the construction of a locking washer which is interposed between the nut 5 and the member against which it is tightened. This washer is designated by the numeral 6 and is formed with a central opening 7 which fits loosely over the shank of the bolt. An annular series of openings surrounding the central opening 7 are formed in the washer 6, and pins 8 are seated within these openings so as to project on opposite sides of the washer. It will be observed that the openings are all inclined in the same direction and that the pins 8 are similarly inclined with respect to the axis of the bolt, the inclination being in a clockwise direction, or in the same direction in which the nut 5 is turned when screwing it into position. The opposite ends of the pins 8 are sharpened or pointed at 9, and the projecting portions of the pins may be upset to provide the shoulders 12 which engage opposite sides of the washer and serve to hold the pins in position. This upsetting may be conveniently brought about at the same time that the extremities of the pins are pointed or sharpened.

With the foregoing construction, it will be obvious that when the nut 5 is screwed tightly into position, the pointed ends 9 of the pins 8 will bite into the base of the nut and the member 4 against which the nut is being tightened. Owing to the fact that the pins 8 are inclined in the same direction in which the nut is turned when being tightened, it will be much easier to screw the nuts into position than to remove the same. After the nut has been firmly seated, the pointed ends of the pins will form a lock between the base of the nut and the member 4 toward which the nut has been screwed, thereby preventing the nut from accidentally turning backward and working loose.

A slight modification is shown in Fig. 4, in which the washer member 6ª is formed with inclined openings having pins 8ª mounted therein, the said pins preferably having a spring action and being formed with chisel edges 9ª at opposite ends thereof. The resiliency of these pins and the chisel edges may in some instances increase the efficiency thereof, although the action of the pins is substantially the same as in the previous instance.

Having thus described the invention, what

I claim as new and desire to secure by Letters Patent, is:—

1. In a nut lock, the combination of a plate, a bolt passing through said plate, a nut threaded on said bolt, a washer fitted loosely upon the bolt and interposed between the nut and the plate, a concentric row of inclined pins passing through the washer and having the ends thereof projecting from the opposite sides of said washer, said projecting ends being sharpened and also offset laterally to form shoulders which project over opposite sides of the plate to hold the pins rigidly in position, the sharpened ends of the pins being adapted to bite into the base of the nut and the plate so as to lock the nut against backward turning after it has once been tightened.

2. A nut lock, comprising a bolt, a nut threaded on said bolt, a washer adapted to be loosely fitted upon the bolt and interposed between the nut and plate, an annular series of pins surrounding said bolt and passing through the washer, said series of pins being rigidly carried in said washer and arranged in a position inclined with respect to the axis of the bolt and in a clockwise direction, the ends of each pin projecting beyond the sides of the washer and being formed of a resilient material so as to have a yielding action, the extremities of said pins being sharpened and adapted to bite into the base of the nut and the plate when the nut is screwed into position.

In testimony whereof I affix my signature in presence of two witnesses.

ASA D. DARLING.

Witnesses:
T. O. BISSELL,
R. H. TAYLOR.

Copies of this patent may be obtained for five cents each, by addressing the "Commissioner of Patents, Washington, D. C."